B. W. MILLER.
SIGNAL APPARATUS FOR AUTOMOBILES.
APPLICATION FILED AUG. 14, 1916.
1,266,702.
Patented May 21, 1918.
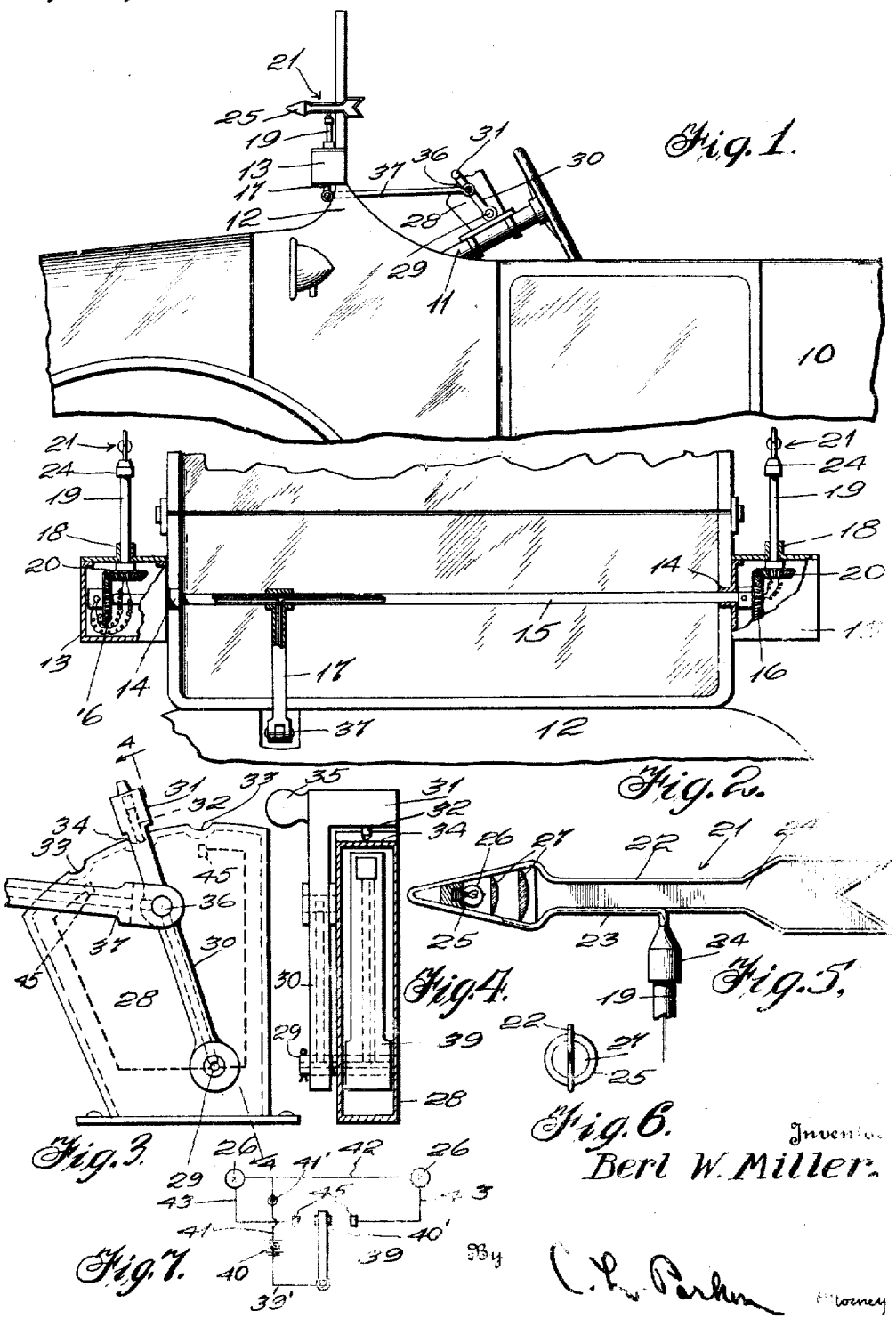
Inventor
Berl W. Miller.

UNITED STATES PATENT OFFICE.

BERL W. MILLER, OF BOISE, IDAHO, ASSIGNOR OF ONE-HALF TO JOHN D. HEINEN, OF BOISE, IDAHO.

SIGNAL APPARATUS FOR AUTOMOBILES

1,266,702.

Specification of Letters Patent. Patented May 21, 1918.

Application filed August 14, 1916. Serial No. 114,774.

*To all whom it may concern:*

Be it known that I, BERL W. MILLER, a citizen of the United States, residing at Boise, in the county of Ada and State of Idaho, have invented certain new and useful Improvements in Signal Apparatus for Automobiles, of which the following is a specification.

The present invention relates to improvements in signaling apparatus, and has particular reference to such apparatus adapted to be carried by an automobile, or other vehicle, and to be actuated by the operator, for indicating the direction in which the vehicle is traveling or is about to travel.

An important object of the invention is to provide apparatus of the above mentioned character, which is simple in construction, inexpensive to manufacture, convenient in use, and not liable to derangements.

A further object of the invention is to provide apparatus of the above mentioned character, which may be installed upon an automobile without materially altering the construction thereof.

A further object of the invention is to provide electrically operated means to illuminate the signal devices, so that the apparatus may be used at night.

Other objects and advantages of the invention will be apparent during the course of the following description.

In the accompanying drawings forming a part of this specification and in which like numerals are employed to designate like parts throughout the same, Figure 1 is a side elevation of apparatus embodying the invention, showing the same applied to an automobile, Fig. 2 is a front elevation of the same, with parts in section, Fig. 3 is a side elevation of the control lever and associated elements, Fig. 4 is a transverse sectional view taken on line 4—4 of Fig. 3, Fig. 5 is a side elevation of signaling apparatus, parts being in section, Fig. 6 is an end elevation of the same, and Fig. 7 is a diagrammatic view of circuits included in the invention.

In the drawings, wherein for the purpose of illustration is shown a preferred embodiment of the invention, the numeral 10 designates an automobile, as a whole, of any well known or preferred construction. This automobile embodies a steering column 11 and a dash 12.

The signaling apparatus comprises a pair of casings 13, which are arranged near the opposite ends of the dash, and secured thereto. It is to be understood that the invention is in no sense restricted to this precise arrangement and location of the casings 13, as the same may be advantageously arranged upon various other parts of the machine, it being preferred however, that the casings 13 be disposed upon or near opposite sides of the automobile. The casings 13 are provided with bearings 14, through which is journaled a tubular shaft 15. Rigidly secured to the ends of this shaft are bevel gears 16, arranged within the casings 13, as shown. The tubular shaft 15 is turned by means of a tubular crank 17, rigidly attached thereto for a purpose to be described.

The casings 13 are provided upon their tops with vertical bearings 18, rotatably receiving vertical tubular spindles or shafts 19, to the lower ends of which are rigidly attached bevel gears 20. These bevel gears are arranged within the casings 13 and engage the bevel gears 16. Attention is called to the fact that the bevel gears 20 are disposed upon the corresponding sides of the bevel gears 16, and the turning movement of the shaft 15 will therefore rotate both shafts 19 in the same direction.

The numeral 21 designates a visual indicator or signaling device, preferably in the form of an arrow, which is rigidly attached to the upper end of the spindle 19. This arrow 21 is preferably formed of a section of bent suitably stiff wire 22, and the ends of this wire are separated and are connected with a tube 23, rigidly secured thereto, continuing the outline of the arrow. The tube 23 passes through a cap 24, and is rigidly secured thereto. This cap is rigidly attached to the tubular spindle 19. The numeral 24' designates a plate or strip, arranged within and secured to the frame of the arrow.

Secured to the forward end or head of the arrow is a socket 25, serving to hold an electric bulb 26 in place. The wires included in the circuit for the bulb, pass through the tubular spindle and tube section 23, and are connected with the bulb through the medium of the socket, as is well known. Rearwardly of the bulb are disposed reflector or reflectors 27, as shown. These reflectors serve to throw the light forwardly across the frame of the arrow.

The numeral 28 designates a casing, which is rigidly attached to the steering column 11 by any suitable means. A horizontal tubular transverse shaft 29 is pivotally mounted within the lower portion of this casing and projects outwardly beyond one side thereof, as shown. Rigidly mounted upon one end of the tubular shaft 29 is a tubular lever 30, provided at its upper end with a laterally extending head 31, overhanging the upper end of the casing 28. The head 31 is provided with a spring pressed finger or latch 32, adapted for insertion within the openings or notches 33 and 34, as shown. The head 31 is provided with a knob or handle 35, by means of which the lever 30 may be manually moved back and forth. Pivotally connected with the lever 30, as shown at 36, is a tubular pitman 37, pivotally connected with the tubular crank 17, as shown. It might be stated at this point, that when the lever 30 is in the neutral position so that the latch 32 enters the opening or notch 34, the arrows 21 extend forwardly and are parallel with the longitudinal axis of the machine. When the lever 30 is moved forwardly toward the forward notch 33, the arrows 21 will be swung to the right, and when the lever is moved in an opposite direction, these arrows will be swung to the left.

Rigidly mounted upon the inner end of the shaft 29 is a tubular contact arm 38, which is insulated therefrom and from the casing 28. The arm 38 has connection with an insulated or covered wire 39', connected with a source of current 40. The opposite pole of the source of current is connected with a wire 41, having a cut-out switch 41' connected therein. The wire 41 is connected with a wire 42. The wire 42 is connected with corresponding poles of the bulbs 26, the opposite poles of which are connected with wires 43, connected with stationary contact segments 45, arranged within and insulated from the casing 28, as shown. The contact arm 38 carries contacts 40', adapted to engage the contacts 45, as shown. All wires in the circuits are preferably covered or insulated and these wires extend through the tubular shafts 13 and 19, the tubular crank 17, the pitman 37, and the tubular cranks 20 and 30. From the foregoing description it is obvious that the bulbs 26 are connected in parallel and when the contact 40' engages the contact 45, the corresponding bulb will glow, thus rendering the arrow visible in the dark.

In the use of the apparatus, when the automobile is traveling in a straight path, the lever 30 is in the neutral position and the arrows 21 project forwardly in parallel relation to the longitudinal axis of the automobile. When it is desired to turn or steer the automobile in either direction, the lever 30 is swung forwardly or rearwardly, as required, and the arrows 21 then swing in the direction in which the automobile is turned. After the turn has been made and the automobile again assumes a straight path of travel, the lever 30 is returned to the neutral position and the arrows moved to their neutral position. When the cut-off switch 41' is turned on, at night, the bulbs 26 alternately glow, to illuminate the arrows 21, when the lever 30 is swung to the forward or rear positions. In the closed circuit for causing either bulb to glow, current flows from the positive side of the source of current 40, through wire 41, wire 42, bulb 26, wire 43, contact 45, contact 40', arm 39, and wire 39' to the opposite pole of the source of current.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described the invention, I claim:

In a signal apparatus for an automobile, a pair of movable visual signal devices including electric lamps adapted to be arranged upon opposite sides of an automobile, a casing adapted to be arranged in convenient reach of the operator of the automobile, a stub shaft extending transversely of the casing to turn therein, a manually operated crank arranged upon the outside of the casing and rigidly connected with the stub shaft to turn it, means to hold the crank in adjustment at a desired position with relation to the casing, a swinging crank arranged within the casing and rigidly secured to the stub shaft and provided with contact means, spaced stationary contacts arranged within the casing with the crank disposed between them whereby the contact means may be alternately swung into contact with said stationary contacts, circuits serving to connect the lamps and the stationary contacts and the contact means, and mechanical means connecting the manually operated crank with the signal devices to shift the same.

In testimony whereof I affix my signature in presence of two witnesses.

BERL W. MILLER.

Witnesses:
EDWARD STERN,
EDW. G. CARROON.